United States Patent
O'Neill

(10) Patent No.: US 9,373,976 B2
(45) Date of Patent: Jun. 21, 2016

(54) SYSTEM AND METHOD FOR CHARGING PORTABLE ELECTRONIC DEVICES

(71) Applicant: Edward L. O'Neill, Oakland, CA (US)

(72) Inventor: Edward L. O'Neill, Oakland, CA (US)

(73) Assignee: Lucasey Manufacturing Company, Oakland, CA (US)

( * ) Notice: Subject to any disclaimer, the term of this patent is extended or adjusted under 35 U.S.C. 154(b) by 96 days.

(21) Appl. No.: 14/076,850

(22) Filed: Nov. 11, 2013

(65) Prior Publication Data

US 2015/0130402 A1    May 14, 2015

(51) Int. Cl.
| | | |
|---|---|---|
| H02J 7/00 | (2006.01) | |
| H02J 7/04 | (2006.01) | |
| H02J 7/02 | (2016.01) | |
| H01H 3/26 | (2006.01) | |
| H01H 9/30 | (2006.01) | |
| H01H 83/00 | (2006.01) | |
| H01H 33/00 | (2006.01) | |

(52) U.S. Cl.
CPC ............. *H02J 7/041* (2013.01); *H02J 7/0013* (2013.01); *H02J 7/0021* (2013.01); *H02J 7/0029* (2013.01); *H02J 7/027* (2013.01); *H01H 3/26* (2013.01); *H01H 9/30* (2013.01); *H01H 33/00* (2013.01); *H01H 83/00* (2013.01); *H02J 7/0052* (2013.01)

(58) Field of Classification Search
CPC ............... H02J 7/00; H02J 7/04; H02J 7/16; H02J 7/24; H02J 7/041; H02J 7/0021; H02J 7/0052; H02J 7/0013; H02J 7/0029; H02J 7/027; H01H 3/26; H01H 33/00; H01H 35/08; H01H 83/00; H01H 9/30
USPC .......... 320/107, 111, 157, 159; 307/116, 137, 307/140
See application file for complete search history.

(56) References Cited

U.S. PATENT DOCUMENTS

| | | | |
|---|---|---|---|
| 5,184,025 A * | 2/1993 | McCurry et al. | 307/66 |
| 6,326,767 B1 * | 12/2001 | Small et al. | 320/116 |
| 8,320,110 B2 | 11/2012 | Chen | |
| 9,297,509 B2 * | 3/2016 | Klipstein | F21L 4/00 |
| 2005/0235523 A1 * | 10/2005 | Flechsig | A43B 13/182 36/3 R |
| 2005/0265035 A1 * | 12/2005 | Brass et al. | 362/451 |
| 2007/0253163 A1 * | 11/2007 | Naghi | F04D 25/166 361/695 |
| 2008/0157698 A1 * | 7/2008 | Tan et al. | 315/294 |
| 2012/0046579 A1 * | 2/2012 | Radl | A61H 11/00 601/46 |
| 2012/0173033 A1 * | 7/2012 | Tischer | 700/295 |

FOREIGN PATENT DOCUMENTS

JP         2002034165 A  *  1/2002  ............... H02J 7/00

* cited by examiner

*Primary Examiner* — Phallaka Kik
(74) *Attorney, Agent, or Firm* — Niro Law, Ltd.

(57) ABSTRACT

A device charging system that uses the fact that individual devices do not need to be continuously charged for an extended charging period in order to be fully charged at the end of the period. With automatic timing and switching, different devices can be charged at different times during the charging period with the result that all the devices are fully charged at the end of the period. Several charging power boxes that fit into one or more charging cabinets that are controlled by one or more timers. Each charging power box also includes a heat sensor and circuit breaker. User appliances or electronic devices can be stacked in the cabinets, plugged into numerous outlets available on the charging power boxes and then locked inside the cabinet for overnight charging and security. Any abnormal rise in temperature within the cabinet can shut down the entire charging process.

20 Claims, 8 Drawing Sheets

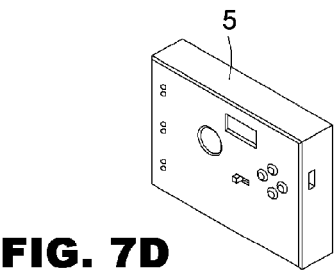
FIG. 7D
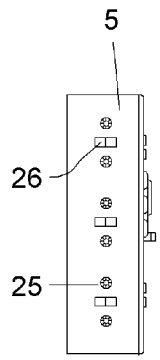
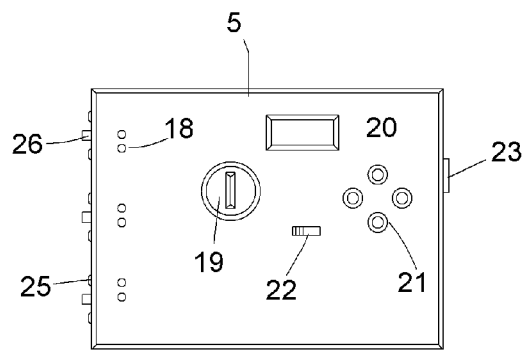
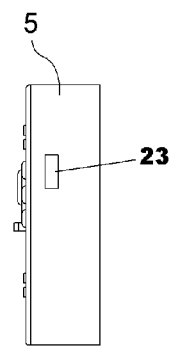
FIG. 7B  FIG. 7A  FIG. 7C

SYSTEM AND METHOD FOR CHARGING PORTABLE ELECTRONIC DEVICES

BACKGROUND

1. Field of the Invention

The present invention relates generally to the field of charging electronic devices and more particularly to system and method for accomplishing this when a particular power source cannot supply enough power to charge a particular ensemble of devices at the same time.

2. Description of the Prior Art

In environments such as schools and the like, numerous small electronic devices such as tablet and laptop computers, smartphones and the like may need charging. Prior art methods include lockers containing power receptacles where these devices can be placed for overnight charging.

However, there is a major problem with charging such devices: they draw considerable charging current from the power line, and they continue to draw this current even after the device is fully charged. For example, a tablet computer may draw around 0.85 Amperes from the AC line, while a laptop may draw as much as 2.2 Amperes. A typical 15 Ampere outlet can thus only charge six laptops of this type at one time. This creates a problem because a typical charging situation may require that 20-30 devices be charged overnight for use the next day.

Prior art solutions to this problem use multiple separate 15 Ampere outlets with multiple cords, or require a much higher amperage supply such as a 20 Ampere or higher outlet. According to the National Electrical Code, a 20 Ampere outlet requires at least #12 AWG wiring. This is expensive and must be specially installed. The use of multiple 15 Ampere outlets usually requires several extension cords (since they are seldom located together), and the total power draw, safety considerations and related cost is considerable.

For example, to charge 24 appliances each requiring 2.2 Amperes is a total current draw of 52.8 Amperes or over 6000 Watts RMS (at 120 Volts RMS). While many devices do not require this much charging current, a classroom having 30 students each with a 0.85 Ampere device can require as much as 25.5 Amperes total AC charging current or over 3000 Watts.

Since devices normally do not require charging for more than a few hours at most, it would be very advantageous to have a charging system that could take advantage of this, and switch different devices in and out for charging during a total charging period (say overnight) thus allowing the use of a single 15 Ampere outlet to power a charging cabinet.

SUMMARY OF THE INVENTION

Accordingly, an object of the present invention is to provide a charging system or station that may charge a number of appliances from a single power receptacle.

Another object of the present invention is to provide a power charging system or station that charges a number of appliances from a single power outlet using a timed sequence.

An additional object of the present invention is to provide a charging system or station that charges a number of appliances from a single outlet which may stop or vary the charging sequence based upon temperature.

A further object of the present invention is to provide a charging system or station that may be used to charge a number of appliances in a room or facility that does not require the installation of additional dedicated power lines or the use of extension cords from other power outlets in the facility or room.

Accordingly, the present invention relates to a safe charging cabinet system that takes advantage of the fact that individual devices do not need to be continuously charged for an extended charging period, like overnight, in order to be fully charged at the end of the period. With automatic timing and switching, different devices can be charged at different times during the charging period with the result that all the devices are fully charged at the end of the period.

In a particular embodiment of the present invention, forty-eight tablet computers that draw 0.85 Amperes of charging current each can be safely charged overnight in a single cabinet powered by a single 15 Ampere power outlet that may be found in a typical school or other building. In other embodiments, charging requirements of different devices can be mixed-and-matched so that all devices can be charged overnight again from a single, 15 Ampere power outlet.

The present invention also includes several charging power boxes that fit into one or more charging cabinets that are controlled by one or more timers. Each charging power box also includes a heat sensor and circuit breaker. The timers are typically contained in a timer control module that may control one or more charging cabinets. User appliances or electronic devices can be stacked in the cabinets, plugged into numerous outlets available on the charging power boxes and then locked inside the cabinet for overnight charging and security. Any abnormal rise in temperature within the cabinet can shut down the entire charging process. Alternatively, an abnormal rise in temperature may result in a staggering of the charging of appliances in different parts of the locker or terminating the effected charging area.

The present inventions also provide for a method of charging a plurality of electronic devices in a total charging interval without exceeding a predetermined amount of charging current, including the steps of: providing one or more AC electrical charging boxes each with one or more groups of charging outlets; providing a timer unit communicating with the AC electrical charging boxes and controlling each of the groups of charging outlets; allowing only enough of the groups of charging outlets to active at one time so that total charge current is less than the predetermined amount of charging current; and, switching different of the groups of charging outlets on and off at programmed times during said total charging interval so that the electronic devices charge during said total charging interval. The sensing of temperature may also be included.

The present inventions may also include a device charging system having at least one charging box, the charging box including one or more groups of charging power outlets; a programmable charging control timer connected to the charging box that switches different of the groups of charging power outlets on and off at predetermined times such that total current draw at all times is less than a predetermined maximum current value; a processor and memory device in the programmable charging control timer adapted to store a charging program; and, a heat sensor located in the charging box configured to shut off charging at or above a predetermined temperature. A programming interface adapted to allow programming of said programmable charging control timer may also be provided.

DESCRIPTION OF THE FIGURES

The stated and unstated objects, features and advantages of the present inventions (sometimes used in the singular, but not excluding the plural) will become apparent from the following descriptions and drawings, wherein like reference numerals represent like elements in the various views, and in which:

FIG. 7A shows a top view of an embodiment of a charging timer control module of the present invention.

FIG. 7B shows a side view of the embodiment of FIG. 7A.

FIG. 7C shows a second side view of the embodiment of FIG. 7A.

FIG. 7D shows a perspective view of the embodiment of FIG. 7A.

Several drawings and illustrations have been provided to aid in understanding the present invention. The scope of the present invention is not limited to what is shown in the figures.

DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The present inventions relate to a safe charging system and method for charging numerous electronic devices during a particular charging period such as overnight using existing power outlets. Timers are used to control which devices or groups of devices are charging at any particular time and for what duration. In addition, temperature sensors may be used to check continuously for over-temperature conditions and can totally or selectively shut down charging if any potentially dangerous temperature condition develops.

Figure 1:
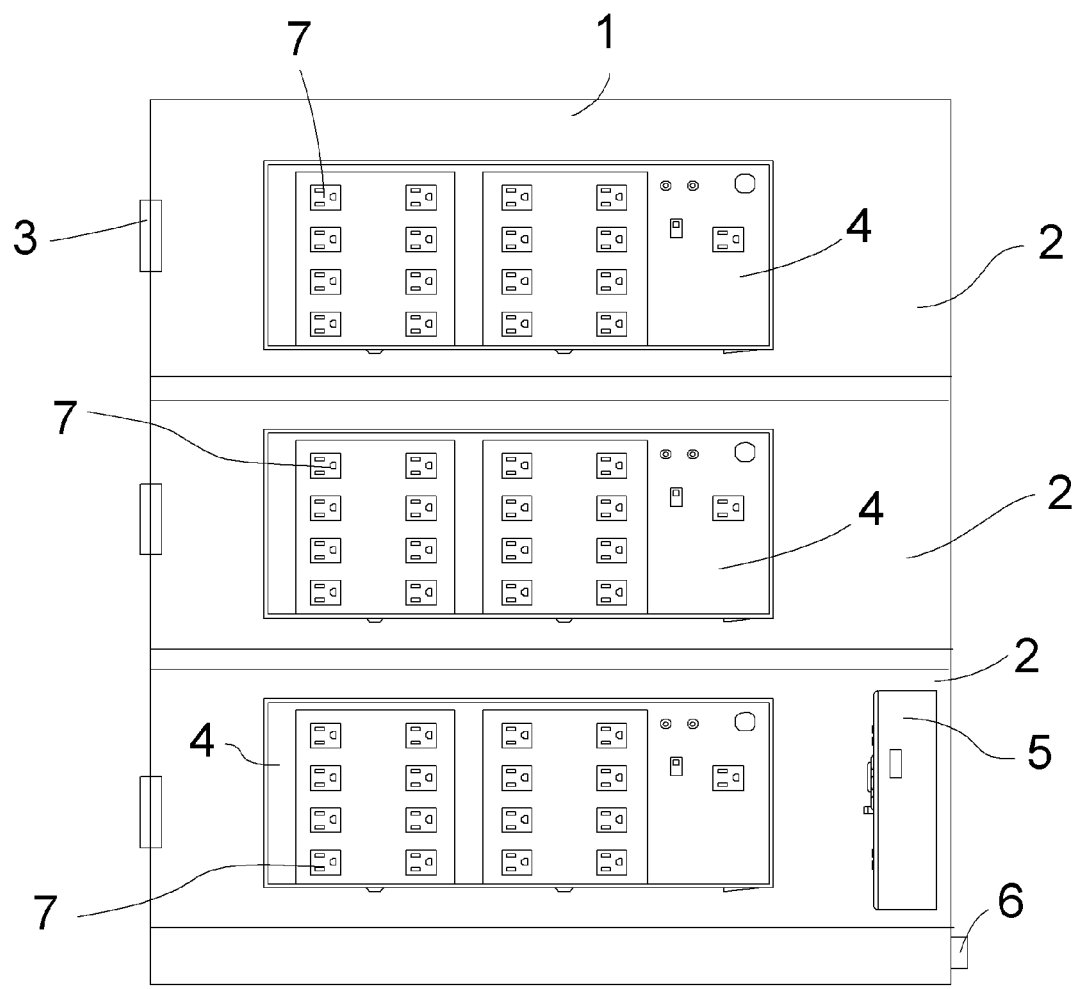
FIG. 1 shows portions of a charging cabinet according to an embodiment of the present invention.

Turning to FIG. 1, a typical charging cabinet according to the present invention can be seen. The cabinet 1 has several stacked compartments 2, each of which may include a lockable door 3. Inside each compartment 2 is one or more charging power boxes 4. A particular but non-limiting embodiment of a charging power box 4 of the present inventions has sixteen power outlets 7 for charging. In this configuration, with one charging power box 4 per compartment 2, up to sixteen devices can be charged in a single compartment 2. A cabinet 1 having three compartments can thus charge up to forty eight independent devices, as there are forty-eight power outlets in this cabinet 1 embodiment. The cabinet 1 also contains a charging timer control module 5 and a power cord 6 that plugs into a standard 15 Ampere building power outlet.

At the beginning of a charging period (for example, after school), all the individual devices to be charged are loaded into the cabinet with each device plugged into a power outlet 7 on the charging power box 4 for that particular compartment 2. The timer control module 5 is either programmed manually or from a PC, or a standard program is selected and activated. The doors 3 of compartments 2 are locked, and the cabinet 1 can be left alone for the charging period. At the end of the charging period (for example, the next morning), all the user devices will be charged. The cabinet 1 can be unlocked, and the devices removed.

A system for a typical timer control module 5 for the embodiment of FIG. 1 may be programmed by entering data from manual programming buttons 21 and a local display 20 (both shown in FIG. 4) or a programming plug that connects the module 5 to a remote computer. Programming from the buttons 21 is typically accomplished by entering a date and time, a schedule such as all weekdays, or selected weekdays or the like, and time and power limits for several groups (in the preferred embodiment, up to six groups). For example, group 1 could be turned on for 60 minutes at 100% power, while groups 2 and 3 could be turned on for 60 minutes at 50% power after group 1 has completed charging. The power limits in this example are determined by the load attached to the particular group which should be known by the user. The module's internal logic will not allow more that 100% power to be supplied across the various groups at any given time. 100% power is typically around 13.6 Amperes. As will be explained later, in some embodiments of the invention, the timer control module 5 can automatically determine attached loads and adjust the group charging accordingly. It will be understood by those of skill in the art that the program may be readily varied depending upon the charging needs and the available power for charging.

Figure 2:
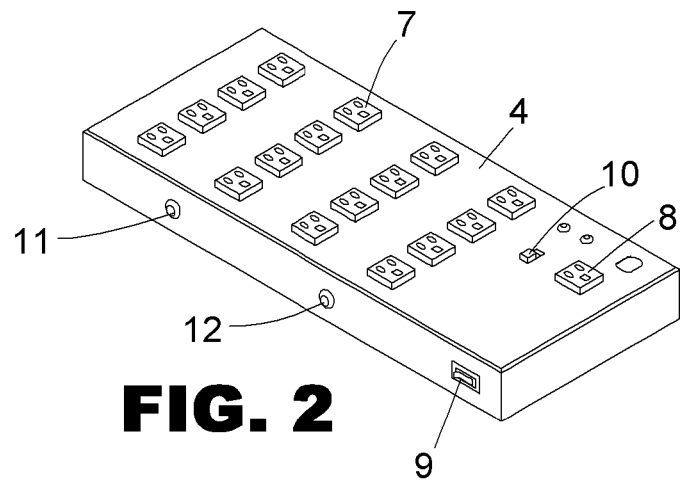
FIG. 2 shows a perspective view of an embodiment of a charging power box of the present invention.

FIG. 2 shows a perspective view of an embodiment of a typical charging power box 4. The box 4 has sixteen standard 3-prong power outlets 7 in two groups of eight. While this is a preferred configuration, any number of outlets 7 and any grouping of outlets 7 is within the scope of the present inventions. A power chain plug 8 is shown at one end of the box 4 in FIG. 2. This chain plug 8 can be used to chain multiple boxes 4 together if needed. A grouping control switch 10 and two charging indicator lights 11, 12 may also be provided. For example, one light 11 or 12 may be provided for each group. The charging indicator lights 11, 12 typically light when AC power is being applied to the group. While two lights are shown, any number or color of lights is within the scope of the present invention to allow for different outlet groupings. A 15 Ampere power breaker 9 is shown on the side of the box 4. The purpose of having one chain plug 8 for each charging power box 4 is to allow multiple boxes 4 to be powered from each other. This is convenient when, for example, there are three boxes 4 in a single cabinet 2 (See FIG. 1). In that situation, only one of the boxes 4 needs to have an external power cord. It will be understood by those of skill in the art that the chain plug 8 is optional, but preferred.

Figure 3A:
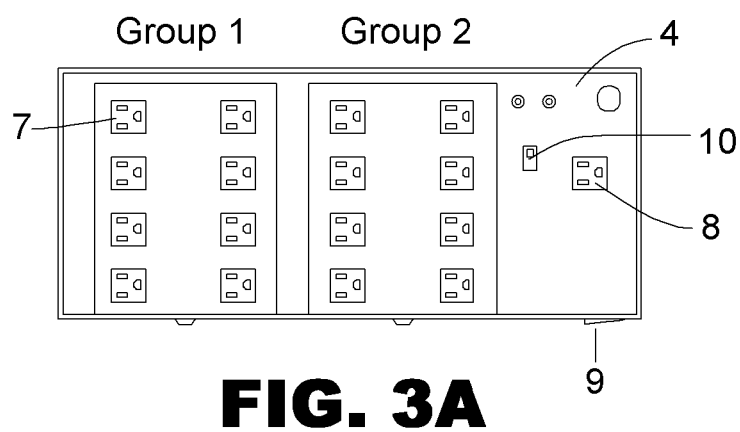
FIG. 3A shows a top view of the charging power box of FIG. 2.
Figure 3B:
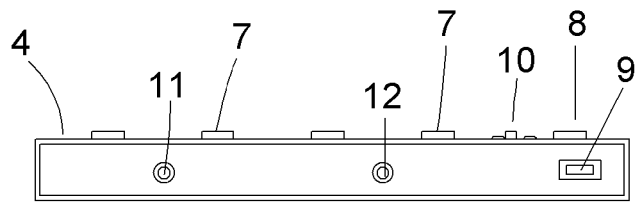
FIG. 3B shows a side view of the charging power box of FIG. 2.

FIG. 3A shows a top view of the charging power box 4 embodiment of FIG. 2. A typical charger power box 4 such as that shown in FIGS. 3A and 3B can be around 7-8 inches wide and around 18-19 inches long. While these are preferred dimensions, any size power boxes are within the scope of the present invention.

In the embodiment shown in FIGS. 2-3, the grouping control switch 10 allows the two groups of outlets 7 on the box to be either separate or tied together into a single group of sixteen outlets. The switch 10 can optionally be supplied with a tamper-resistant cover (not shown) for safety. The functioning of the grouping control switch 10 is as follows: the total current on the box 4 should not exceed 15 Amperes (in fact, for safety, it typically should not exceed around 13.6 Amperes). If the devices being charged are small (for example not using more than 0.85 Amperes while charging each), all sixteen outlets 7 may be charged simultaneously (with a total of around 13.6 Amperes). On the other hand, if the devices being charged are larger (using up to 1.6 Amperes each), the groups can be separated for charging at different times (with a total on a charging group of around 12.8 Amperes).

For example, if there are sixteen devices plugged into a power outlet box 4 in first cabinet and sixteen devices plugged into another power outlet box 4 in a second cabinet, eight can be charged in the first cabinet (on one group) along with eight in the second cabinet (on one group). Then later, the other eight in the first cabinet can be charged (on the other group) and the other eight in the second cabinet (on the other group). This prevents either cabinet 2 from overheating (which might happen if one tried to charge all sixteen devices in the same cabinet at the same time). This example assumes that the total current draw at any time is less than around 13.8 Amperes.

Figure 4:
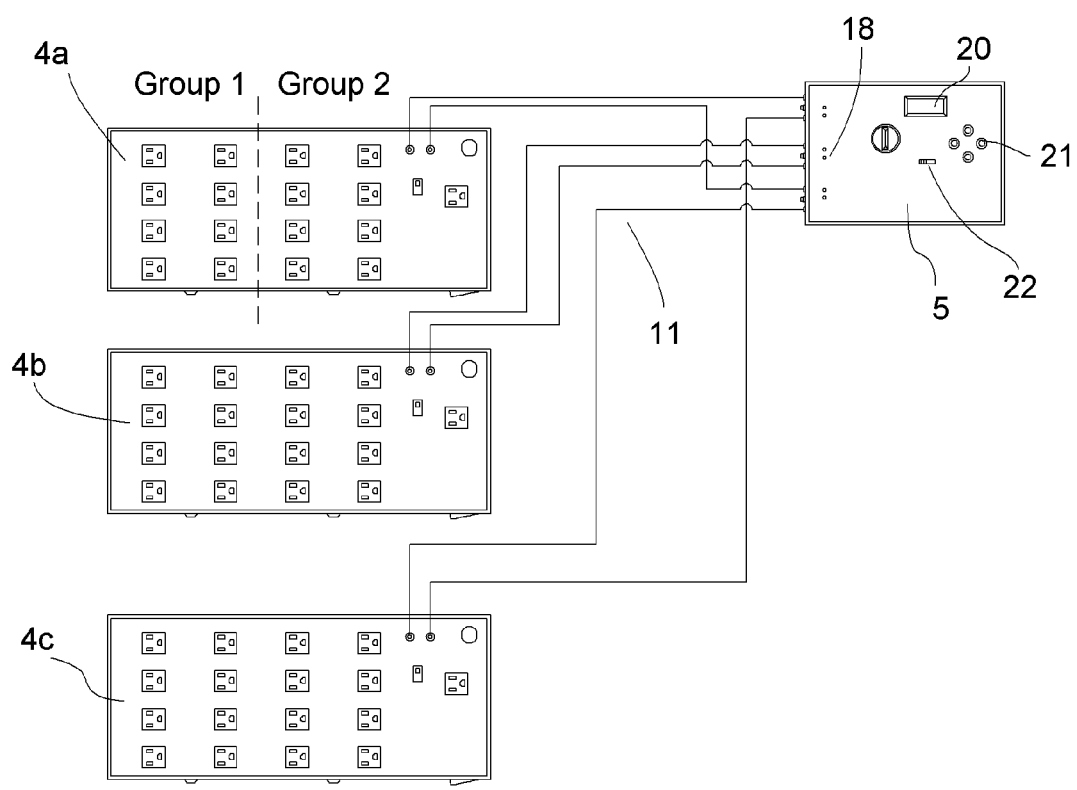
FIG. 4 shows a representative charging timer control module for controlling three charging power boxes.

FIG. 4 shows a single charging timer control module 5 controlling three charging power boxes 4a, 4b, 4c, each having two groups of eight outlets 7. Low voltage (typically 24 volts) wiring 11 is shown. Two low voltage control lines are typically wired from the timer control module 5 to each charging power box 4. Control voltages from the timer control module 5 can independently control each of the six separate groups of eight outlets each for a totally charging capability in three stacked compartments 2 of a cabinet 1 of forty-eight devices (See FIG. 1). If each charging power box 4 is drawing maximum current of less than 15 Amperes, and if charging requires four hours, all forty-eight devices can easily be charged in a twelve hour charging period. For example, if charging began at 5 PM, it would be complete at 5 AM the next morning in plenty of time for class. The entire charging process would never draw more than 15 Amperes, and would preferably be temperature monitored during the night for safety.

Figure 5:
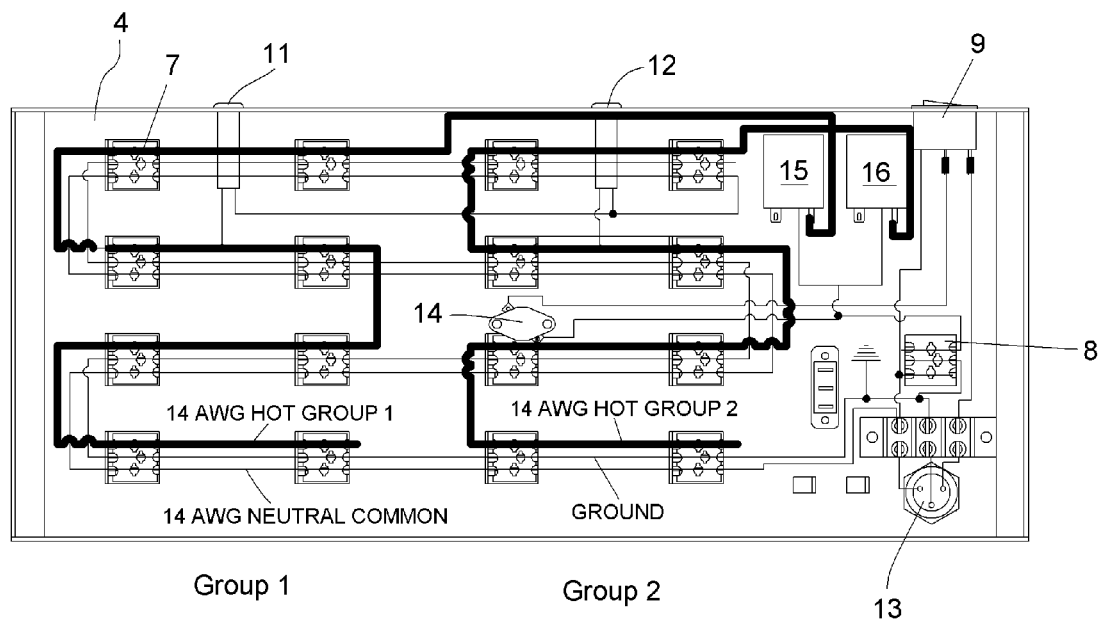
FIG. 5 shows a 120 Volt wiring diagram for another embodiment of a charging power box of the present invention.

FIG. 5 shows a 120 Volt wiring diagram for an embodiment of a 15 Ampere charging power box 4 having two separate charging groups. AC power enters the box 4 from an AC entry connector plug 13 (lower right). This is normally a 3-prong approved 15 Ampere plug. The ground wire (green in U.S.) is grounded to the box 4 and runs to the ground connector on each of the sixteen outlets shown 7 and power chain plug 8. The hot wire (black in U.S.) runs from the entry plug 13 directly to a 15 Ampere circuit breaker 9 and thence through a series thermal switch 14 (center of figure) and on to one contact of two control relays 15, 16 (upper right). The thermal switch 14 can shut the entire system down if the temperature exceeds a predetermined amount. A predetermined high temperature threshold (such as 50 degrees C.) may be chosen by either adjusting the thermal switch 14 or by using a thermal switch 14 with a built-in shut-off temperature.

The first relay 15 controls the Group 1 plugs, and the second relay 16 controls the Group 2 plugs. These plug groups are wired separately from their respective control relays (shown in darker, bold lines in FIG. 5). Timer or control inputs activate one or both of the relays to turn the group I and group II plugs on or off separately. The neutral wire (white in U.S.) runs from the entry plug 13 to all sixteen outlets 7 and the power chain plug 8.

Figure 6:
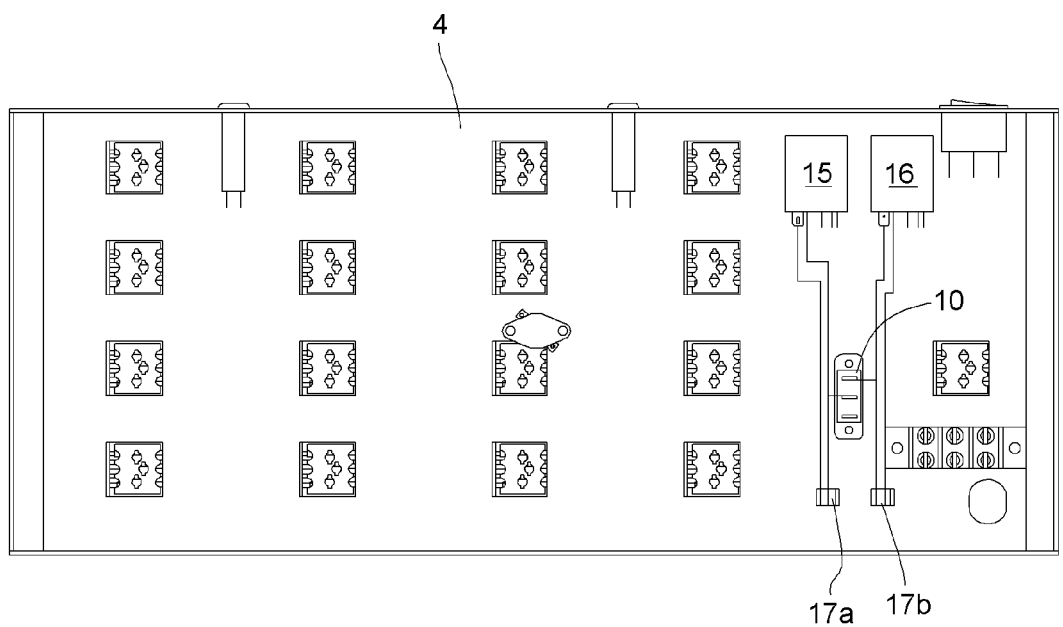
FIG. 6 shows a 24 Volt low voltage wiring diagram for the charging power box of FIG. 5.

FIG. 6 shows an embodiment of low voltage control wiring on a charging power box 4. Relays 15, 16 have their control windings wired to two separate low voltage jacks 17a and 17b that can be wired back to a charging control timer module 5 as shown in FIG. 4. Each of the relays 15, 16 can be independently controlled by the control time module 5 as hereinafter described using the separate jacks 17a and 17b. The grouping switch 10 shorts the two relay control lines together to create a single group of sixteen outlets when desired. In that configuration, and activation voltage on either control line turns on the entire box 4. This feature can be used when it is known that the total charging current draw on all sixteen outlets combined will not exceed a desired maximum for a single box. This, in effect, creates a super-group of sixteen outlets that can be controlled as one by a timer input.

FIGS. 7A-7D show a preferred embodiment of a charging timer control module 5. A typical module 5 may have dimensions of around 9-10 inches by 7-8 inches. While these are preferred dimensions, any size charging timer control module may be used. FIG. 7A shows six charging indicator lights 18 that turn on for the six possible groups under control (on three charging boxes) of the embodiment of FIG. 4. A manual program on/off switch 19 and manual programming buttons 21 can allow manual programming of the control module 5. A program selector switch 22 can select various stored programs. As an alternative to manual programming, a program input plug 23 may be used. This allows direct program input from a PC or other computer device or processor. An optional display screen 20 can show the date/time and program status as well as display error messages and other optional information. While control of up to six groups by a single charging time control module is preferred, any number of groups can be controlled, and any number of individual timers may be used. Timers are programmed either directly from manual controls on the timer or from inputs from a PC application program over a connectable data link.

FIG. 7B shows one side of the charging timer control module 5 of FIG. 7A. Three pairs of low voltage control line jacks 25 are shown that can be wired to the control inputs of three charging power boxes. Optional switches 26 can connect the outputs together to result in three groups instead of six. This can be used with different configurations of cabinets or enclosures. FIG. 7C shows the other side of the module of FIG. 7A. The program input plug 23 can be seen. The preferred plug is a USB plug known in the art; however, any data plug and any data transfer method is within the scope of the present invention.

Figure 8:
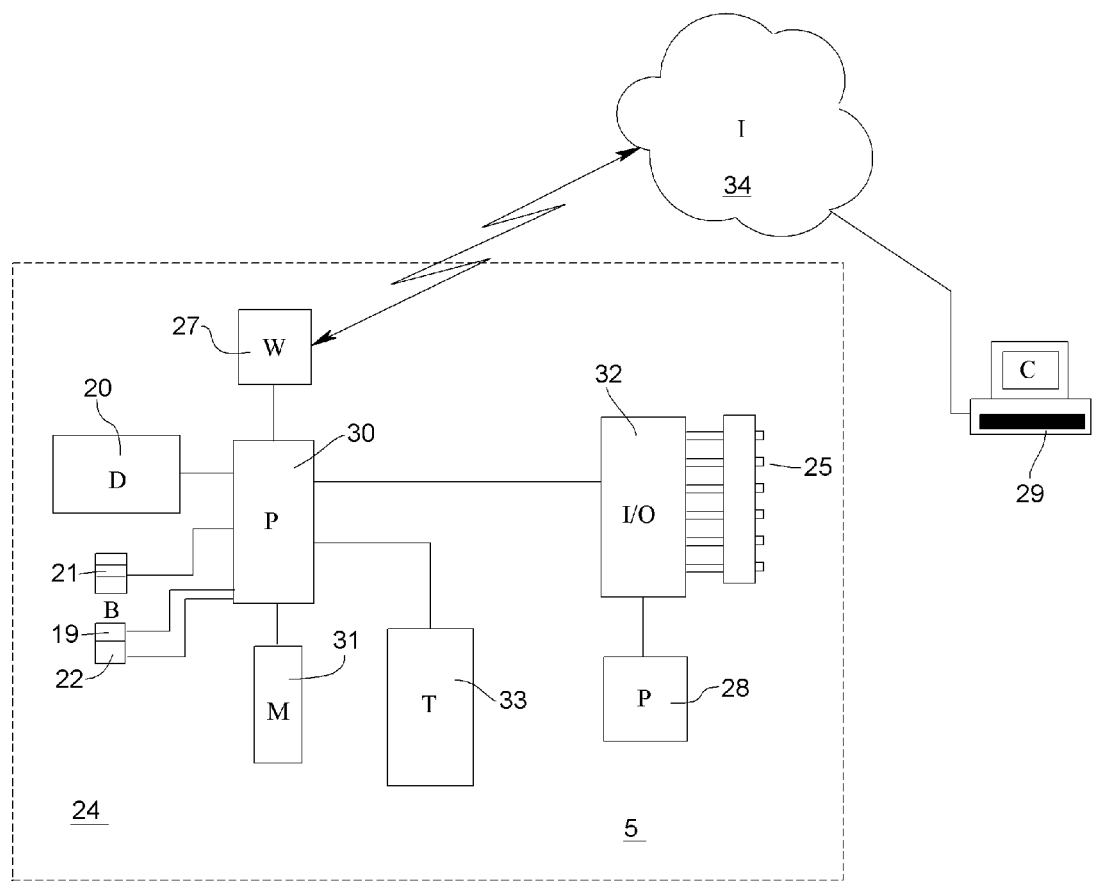
FIG. 8 shows a block diagram of an embodiment of a charging timer control module.

FIG. 8 shows a block diagram of another embodiment of a charging timer 5. A timer module 5 contains a processor 30 and memory 31 as well as I/O interfaces 32. This controller 24 also contains several hardware timers 33. These timers 33 can then control outputs 1-6 via the I/O interfaces 32. The display 20, manual programming buttons 21 and switches 19, 22 are tied to input ports 25 on the controller 24. The controller 24 typically contains a time of day clock inside the processor 30 (or elsewhere) that can start, switch and stop automatic charging based on the time of day and/or the day of the week. The processor 30 can be a microprocessor, microcontroller, ASIC, or hard-wired controller. The memory 31 can be a ROM, RAM, Flash, DRAM or any other memory, solid state or otherwise, known in the art. The memory 31 may reside on the same semi-conductor chip as the processor 30, or may be separate.

FIG. 8 also shows an optional wireless module 27. This module can communicate wirelessly using known techniques such as WiFi, BlueTooth™ cellular telephony, or by any other wireless technique with a remote computer 29. The communication can be direct or via a network 34 such as the Internet as shown in FIG. 8. In this manner, programs and even direct control of the system can be accomplished from a remote location. In particular, the charging timer module 5 can optionally access a remote website using a stored ID for updated programs or control, or, the remote website can be used to send program updates or direct control to the module 5.

FIG. 8 shows a power supply 28 that powers the charging timer module and provides low voltage relay voltages for charging power box relays. This power supply can optionally be powered directly from the 120 Volt AC line or by means of a plug-in transformer known in the art. Any type of power supply is within the scope of the present invention.

A user typically programs a particular charging pattern based on plug grouping, day of the week and time of day. As stated, the programming can be manual on the module or downloaded from a remote computer via a cable or downloaded wirelessly from a remote location either over the Internet or directly.

Figure 9:
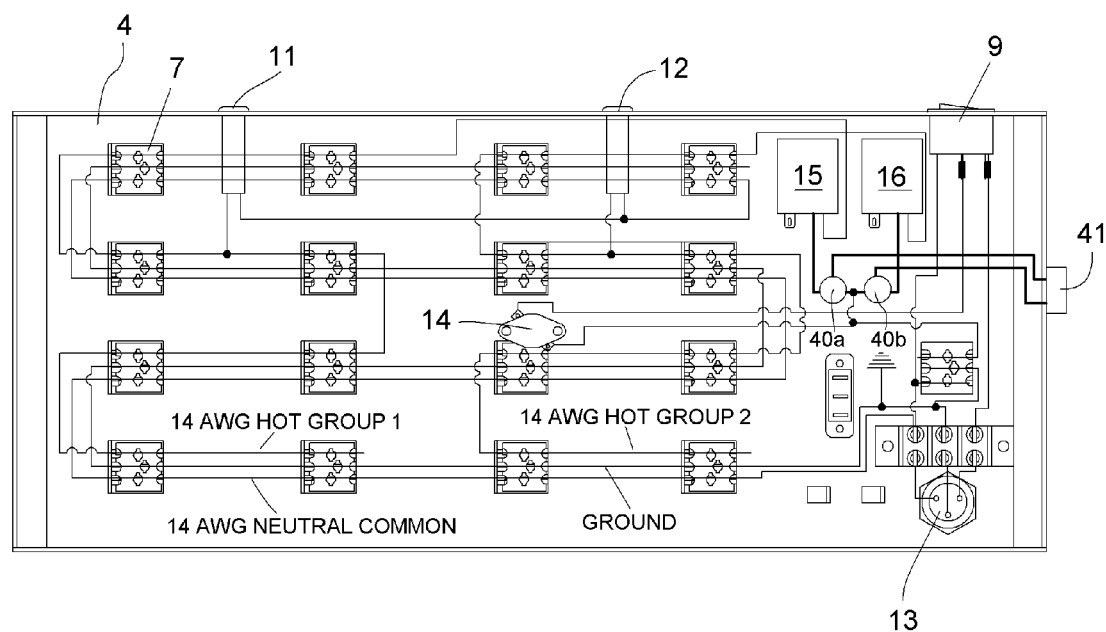
FIG. 9 shows a alternate embodiment of the charging box shown in FIG. 5 with current sensors.

Optionally, each charging power box can be equipped with one or more current monitors 40*a* and 40*b* as shown in FIG. 9 that allow display and/or reporting of box total current or group currents as well as a temperature sensor. An optional second data link 41 can feed current information and/or temperatures back to the charging timer module 5 or remote computer 29. The wireless module can transmit current, temperature and other parameters back to a remote location.

The embodiment of FIG. 9 allows automatic control of charging based on currents in the various current groups. A cabinet 1 such as that shown in FIG. 1 containing several charging power charging boxes 4 with a link to a remote computer can be arbitrarily loaded with devices to be charged. Current data from the optional link 41 is communicated to the remote computer. Data is entered into an application program running on the remote computer as to the length of the total charging interval. The processors in the timer modules can optionally inform the program as to how many power control groups are actually attached and active.

The program can then first power up each separate control group one-by-one to see how much current is consumed by each group. Using that data, along with the maximum current available (usually 15 Amperes), as well as the maximum allowed charging interval and the time needed to charge devices, the program can allocate charging intervals for each power group depending on its current draw. The result is that various charging groups are activated for the length of time needed to charge a typical device, and then these groups can be switched off while other groups are switched on. This process can continue until all the devices in the cabinet are charged. There may be more than one possible solution to the allocation problem. In this case, the program only needs to choose one that will work.

It is possible that a combination of devices may be loaded into the cabinet that cannot all be charged within the total charging interval. In that case, the program can make a decision to not charge some of the devices (groups) so that the rest can charge. The problem and results can be displayed on the remote computer or on a display on a timer module. Alternatively, the program could refuse to start charging.

For the case where temperatures are also fed back to the remote computer, the program can also switch power groups to control total temperature. The present inventions provide a convenient way to charge a large number of electronic devices over a time interval, such as overnight, without exceeding a maximum current draw or a maximum temperature.

Several descriptions and illustrations have been provided that aid in understanding features of the present invention. A person of ordinary skill will realize that numerous changes and variations may be made without departing from the spirit of the invention. Each of these changes and variations is within the scope of the present invention.

What is claimed is:

1. A device charging system comprising:
    a plurality of charging boxes, each including a heat sensor and one or more groups of AC charging outlets;
    a charging control timer connected to said charging boxes that switches different of said groups of AC charging outlets on and off at predetermined times such that total AC current draw at all times is less than a predetermined current value; and,
    wherein the heat sensor located in each of said charging boxes is adapted to independently shut down charging on a box at or above a predetermined temperature.

2. The device charging system of claim 1 wherein said predetermined current value is 15 Amperes.

3. The device charging system of claim 1 wherein said predetermined temperature is 50 degrees C.

4. The device charging system of claim 1 wherein each of said charging boxes includes at least two groups of AC charging outlets.

5. The device charging system of claim 1 further comprising a switch on at least one of said charging boxes that combines at least two of said groups of AC charging outlets.

6. The device charging system of claim 1 further comprising a wireless module cooperating with said charging control timer so that said charging control timer can be programmed from a remote location.

7. The device charging system of claim 1 further comprising one or more current sensors on each of said charging boxes adapted to report current values back to said charging control timer.

8. The device charging system of claim 1 further comprising manual programming buttons on said charging control timer adapted to permit manual entry of program values.

9. The device charging system of claim 1 further comprising control switches on said charging control timer adapted to electrically connect together pairs of said control outputs on said charging control timer.

10. A method of charging a plurality of electronic devices in a total charging interval without exceeding a predetermined amount of charging current comprising the steps of:
    providing one or more AC electrical charging boxes each with a heat sensor and one or more groups of charging outlets;
    providing a timer unit communicating with said AC electrical charging boxes and controlling each of said groups of charging outlets;
    allowing only enough of said groups of charging outlets to be active at one time so that total charge current is less than said predetermined amount of charging current;
    switching different of said groups of charging outlets on and off at programmed times during said total charging interval so that said electronic devices charge during said total charging interval; and
    independently shutting down charging on an AC electrical charging box at or above a predetermined temperature.

11. The method of claim 10 further comprising providing at least one temperature sensor or temperature switch adapted to stop charging on at least one of said AC electrical charging boxes if the temperature for each charging box exceeds a predetermined safe value.

12. The method of claim 10 further comprising providing a programming interface on said timer unit allowing programming of said timer unit from a remote computer.

13. A device charging system comprising:
- at least one charging box, said charging box including a heat sensor and one or more groups of charging power outlets;
- a programmable charging control timer connected to said charging box that switches different of said groups of charging power outlets on and off at predetermined times such that total current draw at all times is less than a predetermined maximum current value;
- a processor and memory device in said programmable charging control timer adapted to store a charging program; and,
- wherein the heat sensor located in said charging box is configured to independently shut off charging of a charging box at or above a predetermined temperature.

14. The device charging system of claim 13 further comprising a display and plurality of buttons allowing local programming of said programmable charging control timer.

15. The device charging system of claim 13 further comprising a programming interface adapted to allow programming of said programmable charging control timer.

16. The device charging system of claim 13 further comprising a wireless module cooperating with said programmable charging control timer so that said programmable charging control timer can be programmed wirelessly from a remote location.

17. The device charging system of claim 13 further comprising at least one temperature sensor adapted to shut off charging if temperature exceeds a predetermined limit.

18. The device charging system of claim 13 further comprising at least one current sensor attached to at least one of said groups of charging power outlets, said current sensor providing connected load data to said processor.

19. The device charging system of claim 18 wherein said processor performs tests and using said current sensor determines attached loads on at least some of said groups of charging power outlets.

20. The device charging system of claim 19 wherein said processor charges said attached loads in an optimum manner without exceeding a predetermined maximum current or temperature.

* * * * *